(12) United States Patent
Montsinger et al.

(10) Patent No.: US 8,986,823 B1
(45) Date of Patent: Mar. 24, 2015

(54) MICROLAYER EXTRUSION COATING AND LAMINATING FOR FLEXIBLE PACKAGING

(75) Inventors: Mark Montsinger, Germantown, TN (US); Michael Williams, Collierville, TN (US)

(73) Assignee: Bryce Corporation, Memphis, TN (US)

( * ) Notice: Subject to any disclaimer, the term of this patent is extended or adjusted under 35 U.S.C. 154(b) by 0 days.

(21) Appl. No.: 13/553,786

(22) Filed: Jul. 19, 2012

Related U.S. Application Data

(60) Provisional application No. 61/509,610, filed on Jul. 20, 2011.

(51) Int. Cl.
| | |
|---|---|
| *B32B 7/02* | (2006.01) |
| *B32B 27/00* | (2006.01) |
| *B32B 27/10* | (2006.01) |
| *B32B 27/08* | (2006.01) |
| *G11B 5/64* | (2006.01) |
| *B32B 37/15* | (2006.01) |

(52) U.S. Cl.
CPC ............... *B32B 7/02* (2013.01); *B32B 37/153* (2013.01)
USPC ........ 428/220; 428/332; 428/336; 428/475.8; 428/483; 428/515

(58) Field of Classification Search
None
See application file for complete search history.

(56) References Cited

U.S. PATENT DOCUMENTS

| | | | |
|---|---|---|---|
| 8,012,572 B2 | 9/2011 | Ramli et al. | |
| 8,080,310 B2 | 12/2011 | Ramli et al. | |
| 8,097,346 B2 | 1/2012 | Chang et al. | |
| 2011/0039098 A1 | 2/2011 | Forloni et al. | |
| 2011/0229722 A1 | 9/2011 | Rivett et al. | |
| 2012/0237747 A1* | 9/2012 | Tai et al. .................. | 428/216 |

* cited by examiner

*Primary Examiner* — Sheeba Ahmed
(74) *Attorney, Agent, or Firm* — Joan L. Simunic

(57) ABSTRACT

The present development is a process for coating a substrate with a microlayered extrusion coating, or for producing a laminate from a first substrate, a microlayered extrudate and a second substrate. The present development also includes a microlayered extrusion coating used for laminating two or more plastic extrudates. The microlayered extrusion coating comprises a microlayer core comprising a plurality of layers of gas barrier material having a thickness of less than five microns per layer with alternating tie layers. The microlayer core is sandwiched between polymeric boundary layers which are further sandwiched between polymeric skin layers. The present microlayered extrudate surprisingly exhibits a gas barrier significantly better than conventional thicker single barrier layers and increased opacity in the extrudate using white pigmented LDPE enhances the printed graphics in a laminate structure using a printed substrate.

15 Claims, 6 Drawing Sheets

MICROLAYER EXTRUSION COATING AND LAMINATING FOR FLEXIBLE PACKAGING

CROSS-REFERENCE TO PRIOR APPLICATIONS

The present application claims priority to U.S. Patent Application 61/509,610 filed 20 Jul. 2011, which is incorporated by reference in its entirety.

BACKGROUND

The present development is a process for extrusion coating a film substrate with a microlayered extrusion coating or for laminating two layers of film substrates with a microlayered extrudate. The present development also includes a microlayered extrudate for use in extrusion coating or extrusion lamination, and the resulting film products formed using the microlayered extrudate. The microlayered extrudate of the present invention comprises a plurality of polymeric microlayers, wherein each layer has a thickness of less than five microns, and preferably less than one micron, and alternating tie layers sandwiched between polymeric boundary layers which are further sandwiched between polymeric skin layers. The resulting product defines a laminate comprising a first substrate/the microlayered extrudate/a second substrate.

Multilayer barrier films are widely used in the packaging industry. Some representative applications include wraps for meat and cheese, and packaging for snack foods, cereals, crackers, cookies, and baking mixes. These multilayer barrier films may comprise a single substrate with a barrier extrusion coating, or two or more substrates may be held together by bonding layers produced through adhesive lamination in polymer layers, such as the bonding produced through extrusion lamination. Failure to achieve good adhesion with the extrusion coating or extrusion lamination can result in delamination which can cause loss of product integrity and, therefore, loss of protection for the food through loss of a moisture and/or oxygen barrier, or may allow the package to tear and expose the food.

As is known in the art, the selection of the layers for any particular multilayer barrier film is dependent on the intended end-use application. Polyethylene (PE) resins, such as low density polyethylene (LDPE) and high density polyethylene (HDPE), are widely used for their ability to provide essential properties such as structural integrity, puncture resistance, and abrasion resistance. Further, PE is a low cost bonding material that can be used with most polymer films. Ethylene-vinyl alcohol copolymers (EVOH) are widely used as barrier layers to prevent the passage of oxygen. Polyamide (PA) films provide moderate oxygen barrier protection. High density polyethylene (HDPE) is commonly used to provide moisture barrier protection. The adhesion layer materials are selected for their ability to adhere to the neighboring layers. For example, mixtures of functionalized polyolefins are often used to facilitate adhesion of the non-polar polyethylene layers to the polar barrier layers.

Extrusion coating is a versatile, low cost technique that has long been applied to multilayer films. The extrusion coating process involves extruding an accurately metered quantity of molten resin from a slot die directly onto a substrate, which is presented as a moving web. The coating and web are then pulled into a nip between a cooling roll and a pressure roll. The pressure between these two rolls forces the extruded molten resin onto the substrate web surface, which is moving at a speed faster than the extruded resin, thereby drawing the molten resin to the required thickness. The cooling roll chills the molten resin into a solid state which then releases from the chrome plated cooling roll.

Extrusion laminating is a process similar to extrusion coating except the extruded hot molten resin, or multiple resins, are fed into the nip between two separate substrates. When the resin cools, it bonds the substrates together. Skin layers of copolymers and terpolymers may be coextruded with the resin to provide improved bonding.

For the extrusion coating and extrusion lamination processes, common substrates are paperboard, corrugated fiberboard, paper, aluminum foils, cellulose or plastic films. The substrates may be multilayered, or metallized, or may include printing, or any combination thereof. For example, the extrusion lamination process may be used to bond an outer printed film substrate and an inner sealing film substrate to form a two-film flexible laminate for packaging. Resins are selected based on the probability of achieving good adhesion. Exemplary resins include polyethylene, LDPE, linear low density polyethylene (LLDPE), binary blends of PE, ethylene vinyl acetate copolymers and polypropylene. Optionally, polymer resin additives, such as maleic anhydrides, acrylate-based resins, or other bond-enhancing resins, can be added to the extrusion resin to improve bonding to specific films.

Although the resins used for producing films and the resins used for extrusion coating and extrusion lamination fall within the same broad chemical classes, there are distinct differences. For the extrusion coating and extrusion lamination processes, the optimal resin must provide sufficient oxidation for bonding to the substrate surfaces. Otherwise, delamination of the substrate from the bonding resin may occur. Conversely, resins selected for film production normally include antioxidants to prevent oxidation. For the extrusion coating and extrusion lamination processes, the resin must have adequate melt flow. For example, a melt flow index equal to or greater than 7 is typical for extrusion lamination for flexible packaging, and a melt flow index equal to or greater than 22 is also optimal for caulkability. By contrast, for film production, resins preferably have melt flow indices less than 5. For the extrusion coating and extrusion lamination processes, the melt temperature of the extruding resin that contacts the substrate surface also affects oxidation. For optimal oxidation the resin preferably has a melt temperature of at least about 585° F., but preferably between about 600° F. and about 620° F., although at these temperatures the melt curtain stability and profile across the web in the transverse direction has some gauge, or thickness, variation. For film production, such as polypropylenes and polyethylenes, the resins selected normally have melt temperatures below about 475° F.

Over the past decade, microlayered films have gained a commercial following. Microlayered films are multilayered films formed by cast coextrusions wherein the film structure comprises one or more sections comprising from less than ten layers to over a thousand layers, each layer being from about 0.01 to about 5 microns thick, and wherein the microlayer section is normally sandwiched between two bulk film layers or is adhered to one surface of a traditional bulk film layer. The layers may be formed in a coextrusion feedblock by splitting and stacking a small number of input melt streams, or by sequential layering to create alternating microlayers which then come together and enter an extrusion die as an extrudate comprising the alternating microlayers. Optical films typically use fewer polymers, and more and thinner layers; barrier films use fewer, thicker microlayers and more polymers.

Some exemplary microlayered films are taught in U.S. Published Application 2011/0229722 A1, U.S. Published Application 2011/0039098 A1, U.S. Pat. No. 8,080,310, and U.S. Pat. No. 8,012,572. U.S. Published Application 2011/0229722 A1 (ascribed to Rivett et al.) describes a multilayer oxygen barrier film that includes at least one bulk layer and a microlayer comprising ethylene vinyl alcohol. Thicknesses of each layer of the microlayer may range from about 0.0001 mils to about 0.1 mils. The film of the '722 application is produced using a system for coextruding a plurality of fluid layers, such as taught in U.S. Published Application 2010/0072655 A1. To produce the film of the '722 application, a microlayered fluid mass is merged with a first bulk layer within a die thereby forming a multilayer film as a relatively thick extrudate, which comprises the bulk layer and the microlayered section as solidified film layers resulting from the fluid (molten) polymer layer and the microlayered fluid mass with the die.

U.S. Published Application 2011/0039098 A1 (ascribed to Forloni et al.) describes a gas barrier film for use in packaging. The film of the '098 application comprises thermoplastic (co)polyamides and ethylene vinyl alcohol copolymers which are split and stacked to produce a microlayered structure. The microlayered structure may be incorporated as a core layer of a film by using, for example, a five-layer feedblock that allows the microlayered melt stream to pass into the feedblock together with a first substrate layer and a second substrate layer and two intermediate adhesive layers, wherein one adhesive layer is positioned between the microlayers and the first substrate layer and the second adhesive layer is positioned between the first and second substrate layers.

U.S. Pat. No. 8,080,310 and U.S. Pat. No. 8,012,572 (both issued to Ramli et al.) describe heat-shrinkable films. The film of the '310 patent comprises a microlayer structure comprising ethylene vinyl alcohol and polyamides; the '572 patent teaches a multilayer film similar to that taught in the '310 patent, but does not expressly include EVOH in the microlayer structure. The '310 patent teaches a film in which the microlayer section is positioned at an exterior surface of the film, such that one of the microlayers forms an outer layer for the resultant heat-shrinkable, multilayer film. As with the film of USPA '722, the microlayered fluid mass is merged with a first bulk layer within the die thereby forming a multilayer film as a relatively thick tape extrudate.

Although the microlayered films taught in the prior art include films with microlayer sections positioned in the core and on the exterior of a film, the microlayered films of the prior art require that the microlayers be coextruded with the bulk layer(s) of the film. For the packaging industry, this is extremely limiting with respect to the selection of substrates that may be employed if the benefits of microlayering are to be recognized.

In response to the above identified problems, it would be desirable to develop a method wherein a microlayered material section could be produced and bonded to bulk film layers using standard extrusion coating or extrusion lamination techniques. Further, it would be desirable for the microlayered material section to provide oxygen barrier benefits, moisture barrier benefits, improved opacity, or a combination thereof, to the resulting multilayered laminate.

SUMMARY OF THE PRESENT INVENTION

The present development is a process for coating a substrate with a microlayered extrusion coating or for producing a laminate from a first substrate, a microlayered extrudate, and a second substrate. The process comprises providing at least one substrate, selecting resins for the microlayer extrusion and delivering the selected resins to a feedblock designed to produce microlayers, producing a microlayered polymer in molten form and extruding the molten microlayered polymer through a feedblock into an extrusion slot die, simultaneously delivering the substrate and the molten microlayered polymer to a nip, allowing the substrate and molten microlayered polymer to feed between a chill roll and a pressure roll, and releasing the resultant microlayer coated substrate from the chill roll. Representative substances to which the microlayered extrudate may be applied include, without limitation, paper, paperboard, metal foil or plastic film.

The present development also includes a microlayered extrudate for use in laminating two or more plastic films, and the resulting product formed using the microlayered extrudate. The microlayered extrudate of the present invention comprises a plurality of polymeric microlayers, wherein each layer has a thickness of less than about five microns, and preferably less than about one micron, and alternating tie layers sandwiched between polymeric boundary layers which are further sandwiched between polymeric skin layers. The resulting product defines a laminate comprising a first substrate/the microlayered extrudate/a second substrate.

When the microlayered extrudate comprises ethylene vinyl alcohol copolymers (EVOH), the microlayered extrudate of the present invention surprisingly exhibits an oxygen barrier significantly better than conventional thicker single EVOH layers. Optionally, to further enhance the oxygen barrier properties, the extrudate that comprises EVOH may further include an anhydride modified linear low density polyethylene or a polyamide arranged in a multilayered core, wherein each layer of EVOH in the core has a thickness of less than one micron. When the microlayered extrudate comprises high density polyethylene (HDPE), the extrudate exhibits a surprisingly improved barrier to moisture relative to a single thicker layer of HDPE. An extrusion coating comprising microlayers of EVOH and HDPE, with appropriately selected tie layers, provides a barrier to oxygen and moisture.

In a first embodiment of the present invention, a single microlayered extrudate core is sandwiched between boundary layers and skin layers to form an extrusion coating with a structure comprising skin/boundary/microlayers/boundary/skin.

Optionally, a secondary polymeric layer may be incorporated between the skin and boundary layers for a structure comprising skin/secondary/boundary/microlayers/boundary/secondary/skin.

In an alternative embodiment, two or more essentially identical multilayered extrudate cores comprising barrier layers and tie layers are separated from each other by a boundary layer, and the multiple-core unit is then coated by skin layers, producing a structure comprising skin/boundary/microlayers/boundary/microlayers/boundary/skin.

Optionally, a secondary polymeric layer may be incorporated between the skin and boundary layers for a structure comprising skin/secondary/boundary/microlayers/boundary/microlayers/boundary/secondary/skin.

The microlayered extrudate cores can be arranged such that a tie layer is in direct contact with each boundary layer. The microlayered extrudate of the present invention surprisingly exhibits improved barrier properties relative to extrudates having significantly thicker and fewer barrier material layers.

DEFINITIONS

Figure 1:
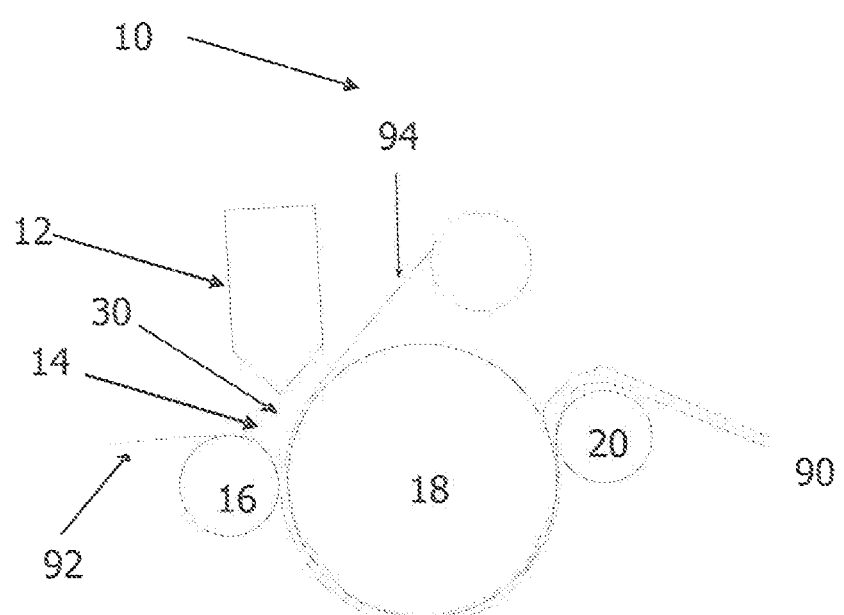
FIG. 1 is a schematic view of a system for producing a laminate comprising a microlayered extrudate made in accordance with the present invention.

"Adhered" broadly refers to the act of binding together at least two materials.

"Air gap" refers to the position and distance of the slot die above the nip.

"Between" broadly refers to the relative position of a layer, substrate, or other material which is shared by and positioned within an interval separating at least two other layers, substrates, or materials.

"Bonding" refers to the act of binding together at least two materials.

"Copolymer" refers to polymers formed by the polymerization reaction of at least two structurally different monomers. When used in generic terms, the term "copolymer" is also inclusive of, for example, terpolymers. The term "copolymer" is also inclusive of random copolymers, alternating copolymers, block copolymers, and graft copolymers.

"Die gap" refers to the opening and spacing between the slot die lips from which the extruded molten resin flows. It controls the thickness and profile of the extrudate.

"Ethylene homopolymer" refers to polymerized ethylene materials such as low density polyethylene (LDPE) and high density polyethylene (HDPE).

"Ethylene vinyl alcohol copolymer" or "EVOH" refers to an ethylene copolymer made up of repeating units of ethylene and vinyl alcohol, typically made by hydrolyzing an ethylene-vinyl acetate copolymer. As used herein, "EVOH" does not include, and specifically excludes, an oxygen scavenging moiety, or a thermoplastic resin having carbon-carbon double bonds.

"Extrudate" refers to a molten polymer stream as it exits an extrusion die.

"Extrusion coating" refers to the process in which an extrudate is extruded onto a substrate in order to coat the substrate.

"Extrusion lamination" refers to the process in which an extrudate is extruded between two substrates in order for the extrudate to form a bonding layer between the two substrates such that the extrudate is adhered to a first substrate on one face and to a second substrate on an opposing face.

"Film" refers to any polymeric or plastic web material, regardless of thickness.

"Gas-barrier" is used herein to identify materials characterized by an Oxygen Transmission Rate (evaluated at 23° C. and 0% R.H. according to ASTM D-3985) of less than 300 cm³/m²·day·bar, or by a Moisture Vapor Transmission Rate (evaluated at 38° C. and 90% R.H. according to ASTM F-1249) of less than 15 g/m²·day·bar, as appropriate in context.

"High density polyethylene" or "HDPE" refers to an ethylene homopolymer or copolymer with a melting point of about 135° C. and a density of 0.940 g/cc or higher. HDPE has greater tensile strength and crystallinity than the LDPE. It is frequently prepared via Ziegler-Natta catalysis or by the use of metallocene catalysts.

"Homogeneous polymer" refers to polymerization reaction products of relatively narrow molecular weight distribution and relatively narrow composition distribution. This term includes those homogeneous polymers prepared using metallocene, or other single-site type catalysts.

"Homopolymer" refers to a polymer resulting from the polymerization of a single type of monomer.

"Inner layer" and "internal layer" refer to any extrudate layer having both of its principal surfaces directly adhered to another layer of the extrudate.

"Internal" refers to a layer bounded on both of its major surfaces with another layer.

"Layer" broadly refers to a single thickness of any material covering a surface or forming an overlying part or segment.

"Low density polyethylene" or "LDPE" refers to a branched polyethylene polymer, partially crystalline, that melts at about 115° C. and has a density of about 0.91-0.94 g/cm⁻³. The branches can be as long as the main chain or as short as one to four carbon atoms; most of the short branches consist of ethyl and n-butyl groups.

"Microlayer" refers to a material layer having a thickness of from about 0.01 to about 5 microns.

"Microlayered film" refers to a multilayered film formed by cast or blown coextrusion wherein the film structure comprises one or more sections comprising from less than ten microlayers to over a thousand microlayers, and wherein the microlayer section is normally sandwiched between two bulk resin layers or is adhered to one surface of a traditional bulk resin layer. The layers may be formed in a coextrusion feedblock by splitting and stacking a small number of input melt streams, or by sequential layering to create alternating microlayers which then come together and enter an extrusion die as an extrudate comprising the alternating microlayers.

"Multilayer" refers to a material that comprises at least two layers, and which may comprise more than two layers.

"Modified polyolefin" is inclusive of modified polymer prepared by co-polymerizing the homopolymer of the olefin or copolymer thereof with an unsaturated carboxylic acid, e.g., maleic acid, fumaric acid or the like, or a derivative thereof such as the anhydride, ester or metal salt or the like. It is also inclusive of modified polymers obtained by incorporating into the olefin homopolymer or copolymer, by blending or preferably by grafting, an unsaturated carboxylic acid, e.g., maleic acid, methyl acrylic acid, fumaric acid or the like, or a derivative thereof such as the anhydride, ester or metal salt or the like.

"Monomer" refers to a molecule whose skeletal structure is repeated in a polymer.

"MVTR" refers to Moisture Vapor Transmission Rate.

"Outer layer" refers to any film layer having only one of its principal surfaces directly adhered to another layer of the film.

"OTR" herein refers to Oxygen Transmission Rate.

"Oxygen barrier polymer" refers to a polymeric material having an oxygen permeability of less than 500 cm³ $O_2$/m²·day. atmosphere (tested at 1 mil thick and at 23° C. according to ASTM D3985). Examples of such polymeric materials are ethylene vinyl alcohol copolymer (EVOH), polyvinylidene dichloride (PVDC), vinylidene chloride/methyl acrylate copolymer, polyamide, amorphous polyamide and polyester.

"Polyamide" refers to polymers having amide linkages along the molecular chain, including synthetic polyamides such as nylons.

"Polyamide layer" or "ethylene-vinyl alcohol layer" or "EVOH layer" refer to layers comprising a major proportion, i.e., >50 wt. %, such as >60 wt. %, >70 wt. %, >80 wt. %, >90 wt. %, >95 wt. %, up to about 100 wt. %, of one or more (co)polyamides or ethylene-vinyl alcohol copolymers (or EVOH) respectively, said amount being calculated on the overall weight of the layer considered.

"Polyethylene" refers to an ethylene homopolymer, or copolymer having greater than 50 mole percent polyethylene. The term "polyethylene" expressly includes low-density polyethylene and high-density polyethylene.

"Polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like.

"Polymer" refers to a substance composed of a collection of individual macromolecules of varying molecular weight or a collection of individual monomers. As used herein, the term "polymer" expressly includes a homopolymer, or a copolymer thereof, including dipolymers, terpolymers, etc.

"Residence time" refers to the length of time the resin is held in the extruder.

"Resin" refers to the polymeric material destined for extrusion or film or plastic production, either pure or with appropriate additives. Conversion of resins to products is usually achieved by subjecting the resin to heat and/or pressure whereupon the polymer softens, is then extruded or shaped or molded, and subsequently allowed to harden.

"Skin layer" refers to an outer layer of a coextruded, multilayer extrudate that acts as a bonding layer to the outer surface of the film during its production and subsequent processing.

"Speed of the laminating web" refers to the rate at which the substrate travels through a laminator.

"Surface energy of the laminating web" refers to the level of energy of the film surface measured in dynes-cm. The higher the surface energy the greater the propensity for bonding.

"Substrate" or "substrate web" refers to any film to which the extrudate may be applied. Exemplary substrates include, but are not limited to, paper, paperboard, metal foil, plastic film, printed film, metallized film, and other materials commonly known in the art which may be subjected to extrusion coating or extrusion lamination.

"Tie layer" refers to a layer of a coextruded, multilayer film that acts as an intermediary between a core layer of the film and another material, such that the laminate strength between the core layer and the other material is improved (increased or decreased). The tie layer's composition can be adjusted to modify or optimize the chemical and physical interactions between film and substrate.

As used herein, "copolymer" and "polymer" are inclusive of homo-polymers and co-polymers.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a layer" includes a plurality of such layers, and so forth.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments±20%, in some embodiments±10%, in some embodiments±5%, in some embodiments±1%, in some embodiments±0.5%, and in some embodiments to ±0.1%, from the specified amount, as such variations are appropriate in the disclosed application.

All compositional percentages used herein are presented on a "by weight" basis, unless designated otherwise; except that compositional percentages for the ethylene content of EVOH herein are given on a mole % basis.

Unless specifically stated to be a closed group, any element for which more than one option is listed should be interpreted to include "and combinations thereof".

DETAILED DESCRIPTION OF THE INVENTION

The following description is intended to provide the reader with a better understanding of the invention. The description is not intended to be limiting with respect to any element not otherwise limited within the claims.

The present development is a process for coating a substrate with a microlayered extrusion coating or for producing a laminate from at least two substrates and at least one microlayered extrudate. FIG. 1 is a schematic of the process 10 for manufacturing a laminate 90 from two layers of film substrates 92, 94 and a microlayered extrudate 30. For extrusion lamination, the process comprises providing at least a first substrate 92 and a second substrate 94. Preselected resins are loaded into a plurality of extruders (not shown) which feed into a feedblock 12 and are coextruded through a slot die (not shown) as a molten microlayered extrudate 30. The molten extrudate 30 is simultaneously delivered to a nip 14 with the first substrate 92 and the second substrate 94, such that the molten extrudate 30 enters the nip 14 sandwiched between the first substrate 92 and the second substrate 94. The first substrate 92/molten microlayered extrudate 30/second substrate 94 structure is fed between a nip roll or pressure roll 16 and a chill roll 18, wherein the molten extrudate 30 is cooled and adheres to the first substrate 92 and the second substrate 94 to form the extrusion laminate 90. The extrusion laminate 90 is then released from the chill roll 18 by a stripper roll 20, and fed to take-up reels or other completed product uses.

The process for extrusion coating is similar to the process for extrusion lamination shown in FIG. 1 except the second substrate 94 is not used to prepare the extrusion coated film. Rather, the molten extrudate 30 is simultaneously delivered to the nip 14 with the first substrate 92. The molten extrudate 30 enters the nip 14 sandwiched between the first substrate 92 and the chill roll 18. As the first substrate 92/molten microlayered extrudate 30 is fed between a pressure roll 16 and the chill roll 18, the molten extrudate 30 is cooled and adheres to the first substrate 92 to form an extrusion coated film (not shown). The extrusion coated film is then released from the chill roll 18 by the stripper roll 20, and fed to take-up reels or other final product uses.

The substrate 92, 94 may be any material to which the extrudate may be applied. Exemplary substrates, without limitation, include paper, paperboard, metal foil, plastic film, metallized film, combinations thereof, and other materials commonly known in the art which may be subjected to extrusion coating or extrusion lamination. The first substrate 92 may be the same as the second substrate 94, or the substrates may comprise different materials, which may have different performance properties. For example, the first substrate 92 may be a metallized film and the second substrate 94 may be a sealing film.

The microlayered extrudate 30 comprises a microlayered core, comprising a plurality of polymeric microlayers and alternating tie microlayers, sandwiched between polymeric boundary layers which are further sandwiched between polymeric skin layers. Each microlayer has a thickness of less than five microns, and preferably a thickness of less than three microns, and most preferably a thickness of less than one micron. The microlayered core comprises at least three microlayers, and more preferably between five and 125 microlayers.

The microlayered extrudate 30 can be produced using cast coextrusion technology known in the art. For example, U.S. Published Application 2005/0029691, assigned to Cloeren and incorporated herein in its entirety by reference, teaches a method for splitting melt streams and creating a microlayer structure in a feedblock.

The resins used to prepare the extrudate 30 are preselected based on several criteria. Because the extrudate needs to bond to a substrate, the skin layer resin must provide sufficient oxidation for bonding to the substrate surface. Otherwise, delamination of the substrate web from the bonding resin may occur. Further, the skin layer resin must have adequate melt flow. The melt flow index should be compatible with the other extrudate resins in the internal layer. For purposes of the present development, a melt flow index equal to or greater than 7 is preferred. If caulkability is a concern, a melt flow index equal to or greater than 22 is recommended. The skin layer resin also preferably has an extruder melt temperature greater than about 475° F., more preferably between about 550° F. and about 675° F., and most preferably between about 600° F. and about 620° F., to obtain optimal oxidation.

Determining the optimal process conditions for the extrusion coating and extrusion lamination is also important. To achieve the desired oxidation of the resin, the residence time, the die gap, the air gap, the speed of the laminating web, and the surface energy of the laminating web must be considered. Larger extruders tend to have longer melt residence times for a given throughput. The longer the residence time, the more likely polymer degradation will occur, which can ultimately affect adhesion of the extrudate to the substrate. Thus, residence time must be optimized to achieve a proper molten state of the resin without causing unnecessary degradation. The die gap is the critical control point for extrudate profile and output on any extrusion coating line. The wider the die gap, the thicker the resulting polymer layer. By selecting a properly-sized die gap, the flow is controlled and an extrudate with a consistent thickness is obtained. Some oxidation of the extrudate takes place after the extrudate exits the die but before making contact with the substrate. Slight oxidation typically facilitates adhesion of the extrudate to the substrate. The air gap and web speed affects the degree of oxidation of the extruding resin—the greater the air gap, the greater the oxidation. Also, the greater the air gap the more unstable the melt curtain becomes and the greater the neck in of the melt curtain on each edge as a result of the cooling of the molten resin. Thus, the air gap must be controlled to achieve optimal adhesion. The speed of the laminating web must be balanced with the air gap, to ensure that the molten extrudate is evenly dispersed on the substrate as the substrate and extrudate are pulled into the nip. Finally, the surface energy of the laminating web must be considered. The higher the surface energy of the substrate surface the greater the propensity for bonding.

In the present development, the extrusion coating or extrusion lamination process is preferably accomplished with a feedblock capable of producing microlayers, such as Cloeren NanoLayer™ Feedblock. The die gap is preferably between about 0.025 mils and about 0.050 mils, and more preferably between about 0.030 mils and about 0.040 mils. The air gap is preferably between about 8 inches to about 15 inches, and more preferably between about 10 inches and 12 inches. The speed of the laminating web is preferably between about 500 ft/min to about 1,800 ft/min, and more preferably from about 800 ft/min to about 1,200 ft/min. The surface energy of the laminating web or substrates is preferably greater than 38 dynes-cm, and more preferably greater than 42 dynes-cm.

Figure 2:
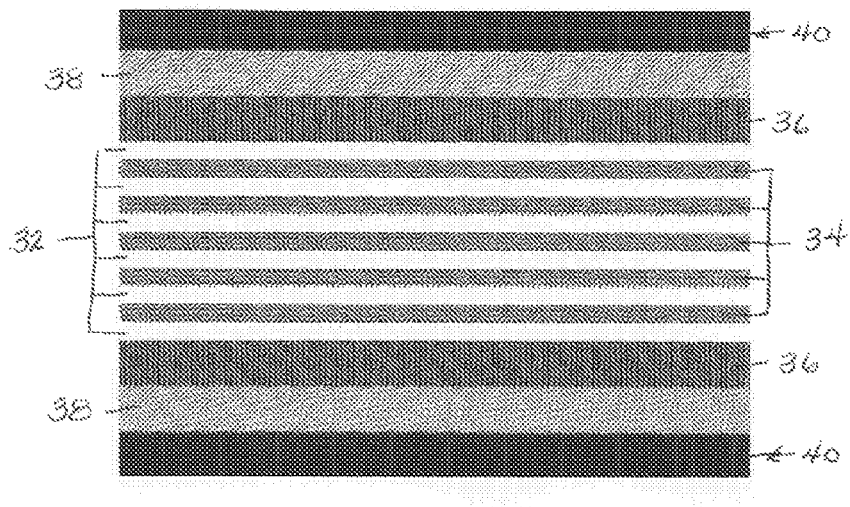
FIG. 2 is a magnified, cross-sectional view of a single section microlayered extrudate that can be produced from the feedblock shown in FIG. 1, wherein the thickness of each layer has been exaggerated for illustration purposes only.

The present development is also a microlayered extrudate for use as an extrusion coating or for an extrusion lamination, and the resulting product formed using the microlayered extrudate. FIG. 2 shows a magnified, cross-sectional view of a single section microlayered extrudate that can be produced from the die shown in FIG. 1, wherein the thickness of each layer has been exaggerated for illustration purposes only. The microlayered extrudate 30 comprises a skin layer 40, an optional secondary polymeric material layer 38, a boundary polymeric layer 36, a barrier microlayer 32, and a tie microlayer 34. Exemplary materials, without limiting the scope of the invention, include the skin layer 40 and the secondary polymeric material layer 38 comprising low density polyethylene (LDPE), the boundary polymeric layer 36 comprising LDPE (if the tie layers 34 are maleic anhydride) or maleic anhydride (if the tie layers 34 are PA), and the tie layer 34 comprising an anhydride modified linear low density polyethylene, ethylene methacrylate, a polyamide, or combinations thereof. The barrier microlayer 32 is selected based on the intended barrier properties, and may comprise ethylene vinyl alcohol copolymer (EVOH), polyvinylidene dichloride (PVDC), vinylidene chloride/methyl acrylate copolymer, polyamide, amorphous polyamide, polyester, other polymers known in the art to impart oxygen barrier properties to films, high density polyethylene (HDPE), low density polyethylene (LDPE), polypropylene (PP), polyethylene terephthalate (PET), other polyolefins known in the art to impart moisture barrier properties to films, or combinations thereof.

Figure 3:
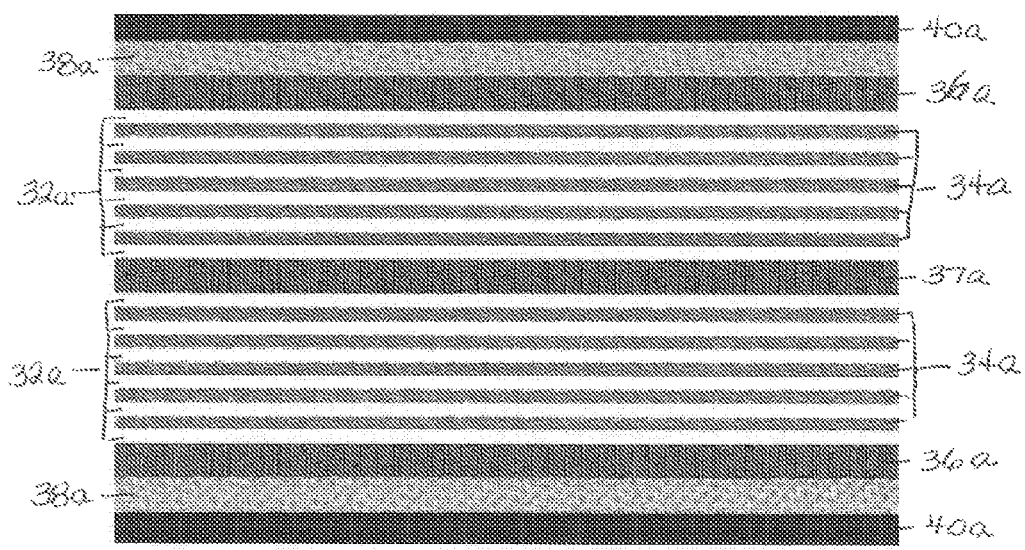
FIG. 3 is a magnified, cross-sectional view of a double section microlayered extrudate that can be produced from the feedblock shown in FIG. 1, wherein the thickness of each layer has been exaggerated for illustration purposes only.

A variation of the microlayered extrudate shown in FIG. 2 is shown in FIG. 3, wherein the extrudate comprises two sections of barrier microlayers and tie microlayers, separated by a boundary layer. Specifically, the microlayered extrudate 30a comprises a skin layer 40a, an optional secondary polymeric material layer 38a, a first boundary polymeric layer 36a, an optional second boundary polymeric layer 37a, a barrier microlayer 32a, and a tie layer 34a.

Figure 4:
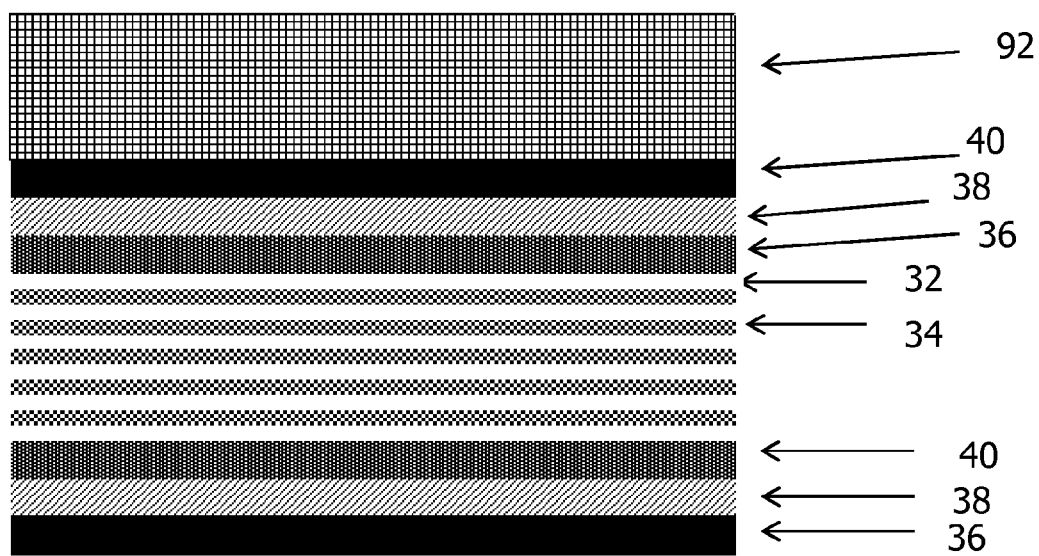
FIG. 4 is a magnified, cross-sectional view of an extrusion coated film with the single section microlayered extrudate prepared and applied according to the invention.
Figure 5:
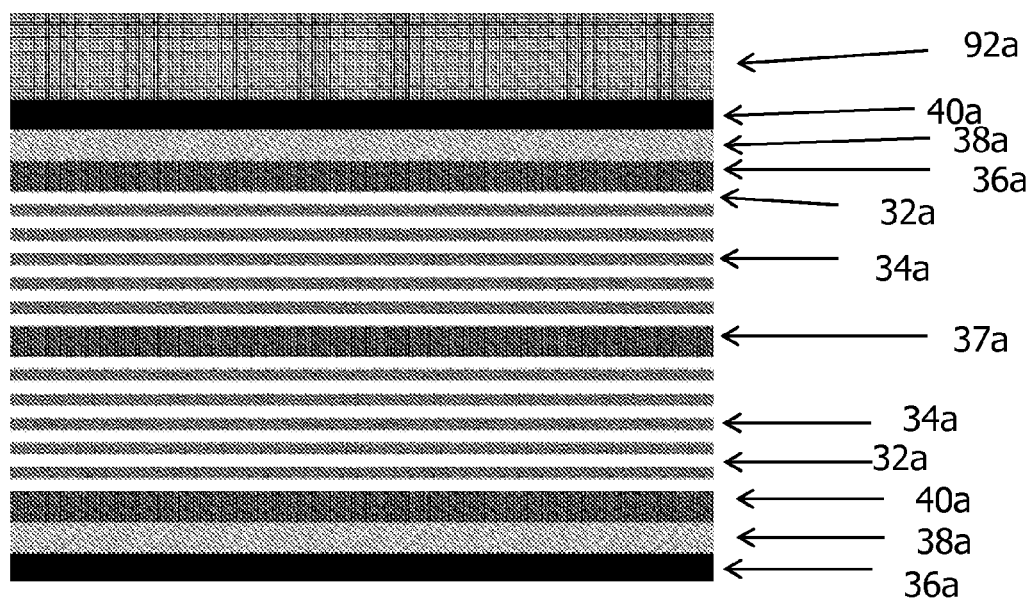
FIG. 5 is a magnified, cross-sectional view of an extrusion coated film with the double section microlayered extrudate prepared and applied according to the invention.
Figure 6:
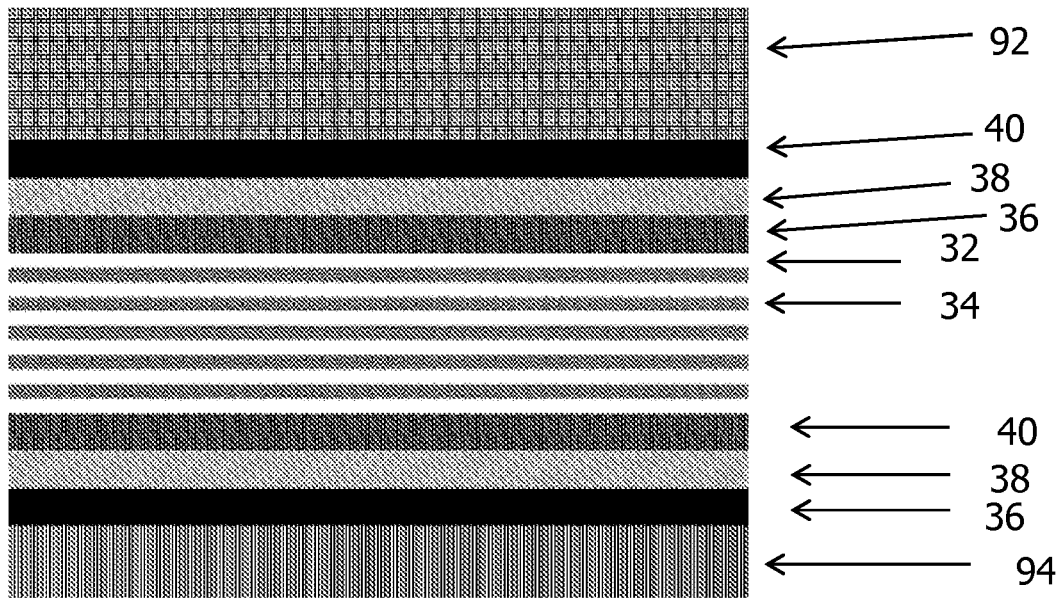
FIG. 6 is a magnified, cross-sectional view of an extrusion laminate with the single section microlayered extrudate prepared and applied according to the invention; and, FIG. 7 is a magnified, cross-sectional view of an extrusion laminate with the double section microlayered extrudate prepared and applied according to the invention.
Figure 7:
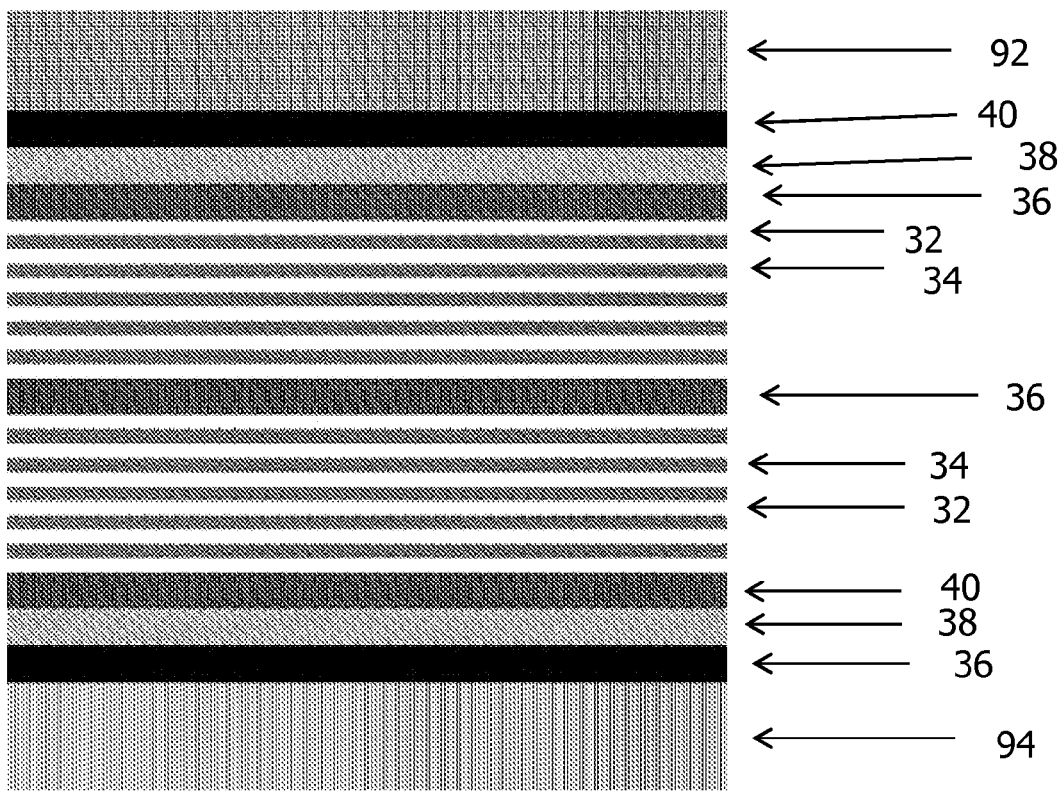

The microlayered extrudate of FIGS. 2 and 3 may be applied as an extrusion coating to substrates, as shown in FIGS. 4 and 5. Alternatively, the microlayered extrudate of FIGS. 2 and 3 may be positioned between two substrates, as shown in FIGS. 6 and 7, to create an extrusion laminate.

The following are representative examples for coated films and laminates using the extrudate and process of the present development. These examples are presented to further explain the invention and are not intended, or to be taken, to limit the scope of the invention. For the purpose of this writing, any reference to "ambient temperature" refers to surrounding air temperatures of about 50° F. to about 110° F.

Embodiment 1 is an extrudate having an eleven-microlayer layered structure

A/B/C/T/E/T/E/T/E/T/E/T/E/T/C/B/A wherein A is the skin layer 40, B is the optional secondary polymeric material layer 38, C is a boundary polymeric layer 36, E is the barrier layer 32, and T is the tie layer 34. Within the structure, the barrier layer E and the tie layer T are combined in a microlayered structure wherein the barrier layer E distribution is controlled so each layer of barrier material has a thickness no greater than five microns, and more preferably each layer has a thickness no greater than three microns, and most preferably each layer has a thickness no greater than one micron.

Embodiment 1A is an extrudate comprising the same materials as the extrudate of Embodiment 1 except the eleven-microlayer layered structure has the relative ordering:

A/B/C/E/T/E/T/E/T/E/T/E/T/E/C/B/A

Embodiment 2 is an extrudate having a seventeen-microlayer layered structure

A/B/C/T/E/T/E/T/E/T/E/T/E/T/E/T/E/T/C/B/A wherein A is the skin layer 40, B is the optional secondary polymeric material layer 38, C is a boundary polymeric layer 36, E is the barrier layer 32, and T is the tie layer 34. Within the structure, the barrier layer E and the tie layer T are combined in a microlayered structure wherein the barrier layer E distribution is controlled so each layer of barrier material has a thickness no greater than five microns, and more preferably each layer has a thickness no greater than three microns, and most preferably each layer has a thickness no greater than one micron.

Embodiment 2A is an extrudate comprising the same materials as the extrudate of Embodiment 2 except the seventeen-microlayer layered structure has the relative ordering:

A/B/C/E/T/E/T/E/T/E/T/E/T/E/T/E/T/E/C/B/A

Embodiment 3 is an extrudate comprising two eleven-microlayer layered sections so the resulting extrudate has the layered structure

A/B/C/T/E/T/E/T/E/T/E/T/E/T/D/T/E/T/E/T/E/T/E/T/E/T/C/B/A wherein A is the skin layer 40*a*, B is the optional secondary polymeric material layer 38*a*, C is a first boundary polymeric layer 36*a*, D is a second boundary polymeric layer 37*a*, E is the barrier layer 32*a*, and T is the tie layer 34*a*. Within the structure, barrier layer E and the tie layer are combined in a microlayered structure wherein the barrier layer E distribution is controlled so each layer of barrier layer E has a thickness no greater than five microns, and more preferably each layer has a thickness no greater than three microns, and most preferably each layer has a thickness no greater than one micron.

Embodiment 3A is an extrudate comprising the same materials as the extrudate of Embodiment 3 except the double eleven-microlayer layered structure has the relative ordering:

A/B/C/E/T/E/T/E/T/E/T/E/T/E/T/D/E/T/E/T/E/T/E/T/E/T/E/C/B/A

ALL EXAMPLES

Unless otherwise specified, all extrudates are prepared using a Cloeren NanoLayer™ Feedblock.

Example 1

An extrudate having an eleven-microlayer structure as taught in Embodiment 1 is prepared using a Cloeren Nano-Layer™ Feedblock with five extruders, A, B, C, E, and T and a melt combining adapter plug A-B-C (T E T E T E T E T) C-B-A, by loading extruders A and C with Westlake EC808 LDPE, omitting extruder B, loading extruder E with Evalca C109 EVOH having a 35 mole percent ethylene content and a loading of 0.3 lb/ream/microlayer, and loading extruder T with a polyamide resin. The resulting extrudate has 2.5 microns thickness EVOH total, for five microlayers of EVOH each microlayer having a thickness of about 0.5 micron. The extrudate is used for extrusion lamination with an oriented polypropylene film (OPP, AET PST-2) having a thickness of about 0.7 mils (17.8 microns) and a heat-sealable OPP coex film (AET AQS) having a thickness of about 0.7 mils (17.8 microns). The initial web speed is 200 meters/minute, and is increased gradually to the desired production rate. The extrudate is simultaneously delivered to the nip with the two OPP films such that the extrudate is sandwiched between the OPP film and the OPP coex film. The sandwiched OPP film/extrudate/OPP coex film is fed between a chill roll, having a diameter of 1000 mm and a temperature set at 40° C., and a pressure roll, and the resultant laminate is then released from the chill roll. The laminate, the OPP film/microlayered extrudate/OPP coex film, is produced as trimmed rolls at 1525 mm (60 inches) on 6 inch cores, and exhibits an MVTR of 0.22 g/100 in$^2$/day and an OTR of 0.21 cc/100 sq. in/24 hr.

Example 2

An extrudate having an eleven-microlayer structure as taught in Embodiment 1A is prepared using a Cloeren Nano-Layer™ Feedblock, with seven extruders A, B, C, T, E, F, G and a melt combining adapter plug B-A-F (E-T-E-T-E-T-E-T-E-T-E) G-A-C. Marflex 4553 LDPE is extruded in B extruder at 210 kg/hr for a 12 micron layer, A extruder is turned off, Marflex 4553 LDPE is extruded in F extruder at 150 kg/hr for a 9 micron layer, Marflex 4553 LDPE is extruded in G extruder at 150 kg/hr for a 9 micron layer, Marflex 4553 LDPE is extruded in C extruder at 210 kg/hr for a 12 micron layer, Marflex 4553 is extruded in E extruder at 240 kg/hr for a total 14 micron layer thickness across 6 microlayers, and Marflex 4553 LDPE is extruded in T extruder at 150 kg/hr for a total 9 micron thickness across 5 microlayers. After the extrudate melt curtain is stable and the profile shows minimal thickness variation across the die width, resin EX-HP-5667-AB HDPE is fed into E extruder and the output adjusted to 6 lbs/ream, or 10 microns for 6 microlayers. T extruder is adjusted to 6 lbs/ream or 10.6 microns for 5 microlayers. The chill roll diameter is 1000 mm and the temperature is set at 40° C. The primary unwind feeds an oriented polypropylene (OPP) film (AET PST-2) with thickness of 0.7 mils (17.8 microns) and the secondary unwind feeds a high barrier OPP film (AET HXB) with thickness of 0.8 mils (20 microns). The microlayered extrudate is fed into the laminator nip section creating a laminate of 17.8 microns OPP film/microlayered extrudate/20 microns high barrier OPP film, and producing trimmed rolls at 1525 mm (60 inches) on 6 inch cores. The web speed is started at 200 meters/minute and increased gradually to a desired production rate. The resulting extrudate has six microlayers of HDPE wherein each microlayer has a thickness of about 1.7 micron, five microlayers of LDPE serving as the tie layer where in each microlayer has thickness of approximately 2.1 micron and four layers of LDPE wherein the two layers immediately neighboring the eleven microlayers each have a thickness of about 0.3 mils and the two outer layers each have a thickness of about 0.5 mils. The laminate had interlaminate bonds of 325 grams/inch to the OPP film surfaces suitable for flexible packaging.

Example 3

An extrudate having a seventeen-microlayer structure as taught in Embodiment 2 is prepared. Layers A and C are Westlake EC808 LDPE, layer B is omitted, layer E is Evalca C109 EVOH with a 35 mole percent ethylene content and with a loading of 0.2 lb/ream/microlayer, and layer T is a 40 wt % Plexar® PX5125/60 wt % Westlake EC808 blend (maleic anhydride modified LLDPE/LDPE). The resulting extrudate has eight microlayers of EVOH wherein each microlayer has a thickness of about 0.3 micron, nine tie microlayers wherein each microlayer has a thickness of less than about 0.5 micron, and four layers of LDPE wherein the two layers immediately neighboring the tie layer each have a thickness of about 0.15 mil and the two outer layers each have a thickness of about 0.15 to 3.0 mils.

Examples 4A, B, C

An extrudate having a seventeen-microlayer structure as taught in Embodiment 2 is prepared. Layers A and C are Westlake EC808 LDPE, layer B is omitted, layer E is Kuraray EVAL™ LT 174 EVOH with a 27 mole percent ethylene content, and layer T is a polyamide. The resulting extrudate has eight microlayers of EVOH wherein each microlayer in Example 4A has a thickness of about 0.175 micron (loading of 0.125 lb/ream/microlayer), each EVOH microlayer in Example 4B has a thickness of about 0.35 micron (loading of 0.25 lb/ream/microlayer), and each EVOH microlayer in Example 4C has a thickness of about 0.525 micron (loading of 0.375 lb/ream/microlayer). The extrudate also comprises nine microlayers of polyamide wherein each microlayer has a thickness of less than about 0.48 micron, and four layers of LDPE wherein the two layers immediately neighboring the tie layer each have a thickness of about 0.2 mils and the two outer skin layers each have a thickness of about 0.14 mils.

Examples 5A, B, C

An extrudate having a double eleven-microlayer structure as taught in Embodiment 3 is prepared. Layers A and C are Westlake EC808 LDPE, layer B is omitted, layer D is Westlake EC808 LDPE, layer E is Kuraray EVAL™ LT 174 EVOH with a 27 mole percent ethylene content, and layer T is a Westlake EC808 LDPE. The resulting extrudate has ten microlayers of EVOH wherein each microlayer in Example 5A has a thickness of about 0.21 micron (total loading of 1.5 lbs/ream or loading of 0.15 lb/ream/microlayer), each EVOH microlayer in Example 5B has a thickness of about 0.40 micron (total loading of 3.0 lbs/ream or loading of 0.3 lb/ream/microlayer), and each EVOH microlayer in Example 5C has a thickness of about 0.61 micron (total loading of 4.5 lbs/ream or loading of 0.45 lb/ream/microlayer). The extrudate also comprises twelve microlayers of LDPE wherein each microlayer has a thickness of less than about 0.48 micron, one boundary layer of LDPE which has a thickness of about 0.2 mils, and four layers of LDPE wherein the two layers immediately neighboring the tie layer each have a thickness of about 0.2 mils and the two outer skin layers each have a thickness of about 0.14 mils.

Examples 6A, B, C

An extrudate having a double eleven-microlayer structure as taught in Embodiment 3 is prepared according to Example 5 except layer E is Soarnol BG3522B EVOH with a 35 mole percent ethylene content, and layer T is 25 wt % maleic anhydride in LDPE. The resulting extrudate has ten microlayers of EVOH wherein each microlayer in Example 6A has a thickness of about 0.25 micron (loading of 0.15 lb/ream/microlayer), each EVOH microlayer in Example 6B has a thickness of about 0.51 micron (loading of 0.30 lb/ream/microlayer), and each EVOH microlayer in Example 6C has a thickness of about 0.61 micron (loading of 0.45 lb/ream/microlayer). The extrudate also comprises twelve microlayers of LDPE wherein each microlayer has a thickness of less than about 0.48 micron, one boundary layer of LDPE which has a thickness of about 0.2 mils, and four layers of LDPE wherein the two layers immediately neighboring the tie layer each have a thickness of about 0.2 mils and the two outer skin layers each have a thickness of about 0.14 mils.

Examples 7A, B, C, D

An extrudate having a seventeen-microlayer structure as taught in Embodiment 2A is prepared. Layers A and C are Marflex 4553 LDPE, layer B is omitted, layer E is EX-HPS67-AB HDPE, and layer T is a Marflex 4553 LDPE. The resulting extrudate has nine microlayers of HDPE wherein each microlayer in Example 7A has a thickness of about 1.5 microns (loading of 0.88 lb/ream/microlayer), each HDPE microlayer in Example 7B has a thickness of about 2.25 microns (loading of 1.11 lb/ream/microlayer), each HDPE microlayer in Example 7C has a thickness of about 2.63 microns (loading of 1.33 lb/ream/microlayer), and each HDPE microlayer in Example 7D has a thickness of about 3.39 microns (loading of 1.56 lb/ream/microlayer). The extrudate also comprises eight microlayers of LDPE wherein each microlayer has a thickness of less than about 0.62 micron, and four layers of LDPE wherein the two layers immediately neighboring the tie layer each have a thickness of about 0.375 mils and the two outer skin layers each have a thickness of about 0.375 mils.

Examples 8A, B, C

An extrudate having a double eleven-microlayer structure as taught in Embodiment 3A is prepared. Layers A and C are Dow 722 LDPE, layer B is omitted, layer D is Dow 722 LDPE, layer E is Marflex 9608 HDPE, and layer T is a Dow 722 LDPE. The resulting extrudate has twelve microlayers of HDPE wherein each microlayer in Example 8A has a thickness of about 1.15 microns (loading of 0.67 lb/ream/microlayer), each HDPE microlayer in Example 8B has a thickness of about 1.44 microns (loading of 0.83 lb/ream/microlayer), and each HDPE layer in Example 8C has a thickness of about 1.73 microns (loading of 1.0 lb/ream/microlayer). The extrudate also comprises ten microlayers of LDPE wherein each microlayer has a thickness of less than about 0.48 micron, one boundary layer of LDPE which has a thickness of about 0.2 mils, and four layers of LDPE wherein the two layers immediately neighboring the tie layer each have a thickness of about 0.2 mils and the two outer skin layers each have a thickness of about 0.14 mils.

The microlayered extrudate of the present invention surprisingly exhibits barrier properties that are significantly better than conventional thicker single barrier material layers. Table 1 summarizes results for oxygen barrier studies using samples prepared from the above examples. Table 2 summarizes results for moisture barrier studies using samples prepared from the above examples. For reference, theoretical values for OTR have been determined assuming a standard monolayer coating with an EVOH loading comparable to each sample, and theoretical values for MVTR have been determined assuming a standard monolayer coating with an HDPE loading comparable to each experimental sample.

TABLE 1

| Example | EVOH (μ) avg per microlayer/ total in extrudate | lb/ream/ microlayer | OTR (cc/100 sq. in/24 hr) @ 23° C. and 0% RH | |
|---|---|---|---|---|
| | | | actual | theoretical |
| 4A | 0.175/1.4 | 0.125 | 1.95 | 0.70 |
| 4B | 0.350/2.8 | 0.25 | 0.34 | 0.34 |
| 4C | 0.525/4.2 | 0.375 | 0.19 | 0.22 |
| 5A | 0.21/2.1 | 0.15 | 0.094 | 0.120 |
| 5B | 0.40/4.0 | 0.30 | 0.071 | 0.090 |
| 5C | 0.61/6.1 | 0.45 | 0.061 | 0.065 |
| 6A | 0.25/2.5 | 0.15 | 1.46 | |
| 6B | 0.51/5.1 | 0.30 | 1.08 | |
| 6C | 0.76/7.6 | 0.45 | 0.78 | |

TABLE 2

| Example | HDPE (μ) avg per microlayer/ total in extrudate | lb/ream/ microlayer | MVTR (g/100 in²/day) @38° C. and 90% RH | |
|---|---|---|---|---|
| | | | actual | theoretical |
| 7A | 1.7/13.5 | 0.88 | 0.26 | 0.45 |
| 7B | 2.5/20.3 | 1.11 | 0.20 | 0.30 |
| 7C | 3.0/23.7 | 1.33 | 0.19 | 0.26 |
| 7D | 3.8/30.5 | 1.56 | 0.14 | 0.20 |
| 8A | 1.38/13.8 | 0.67 | 0.25 | 0.64 |
| 8B | 1.73/17.3 | 0.83 | 0.22 | 0.51 |
| 8C | 2.07/20.7 | 1.0 | 0.21 | 0.28 |

An unexpected benefit is also observed with respect to opacity. Laminates are prepared according to Embodiment 3 using a white polyethylene blend of 15% white concentrate/ 70% TiO$_2$ loading in place of the barrier layers in the examples set forth above, and using a standard clear polyethylene as tie layers. Opacity of the resulting extrudates is determined using a BNL Opacimeter. With a white polyethylene microlayer of about 1.35μ (total PE of about 13.5μ), the opacity is 54.0%; with a white PE microlayer of about 2.03μ (total PE of about 20.3μ), the opacity is 55.2%; and, with a white PE miccrolayer of about 2.71μ (total PE of about 27.1μ), the opacity is 66.1%. For reference, a 17 micron thick monolayer of white PE has an average opacity of about 51% to 53%.

It is anticipated that the microlayered extrudate technology may be used for other material combinations. For example, high density polyethylene may be combined with low density polyethylene to improve the moisture barrier of the extrudate. In another variation, white LDPE may be used in combination with clear LDPE to boost the opacity of the resulting extrudate—a factor that is important when the extrudate will become part of a printed package. Further, it is anticipated that more than two cores may be incorporated between skin layers, provided the cores are separated from each other by at least one boundary layer. Although the multiple core structure described herein (FIG. 2) uses essentially identical cores, it is also anticipated that multiple core structure wherein the cores are not identical may be used to form microlayer extrudates according to the present invention.

Utilizing microlayer technology and improving the oxygen and moisture barrier properties of a flexible packaging structure, it is possible to increase significantly the shelf life of foods packaged in hot-fill containers, stand-up pouches, flexible bags, and vacuum skin packaging. Theoretically, multiple microlayers produce a synergistic effect that reduces oxygen ingress relative to a conventional barrier coextrusion.

Specific dimensions relevant to the microlayered extrudates are provided herein for the purpose of demonstrating the invention, but these dimensions are not intended to limit the scope of the invention. It is understood that one skilled in the art may make alterations to the embodiments shown and described herein without departing from the scope of the invention.

What is claimed is:

1. An extrudate for use in extrusion lamination or extrusion coating, said extrudate comprising a first microlayered core sandwiched between boundary layers and skin layers to form a structure comprising:
   skin/boundary/microlayered core/boundary/skin
   wherein said skin layer and said boundary layer is selected from the group consisting of low density polyethylene, maleic anhydride, and combinations thereof, and wherein said microlayered core comprises at least one barrier microlayer selected from the group consisting of ethylene vinyl alcohol copolymer (EVOH), polyvinylidene dichloride (PVDC), vinylidene chloride/methyl acrylate copolymer, polyamide, polyester, high density polyethylene (HDPE), low density polyethylene (LDPE), polypropylene (PP), polyethylene terephthalate (PET), and combinations thereof, adhered to at least one tie microlayer selected from the group consisting of maleic anhydride, anhydride modified linear low density polyethylene, ethylene methacrylate, polyamide, and combinations thereof, and wherein the thickness of the barrier microlayer is less than about five microns and the thickness of the tie microlayer is less than about five microns.

2. The extrudate of claim 1 wherein the thickness of the barrier microlayer is less than about three microns.

3. The extrudate of claim 2 wherein the thickness of the barrier microlayer is less than about one micron.

4. The extrudate of claim 1 wherein a secondary polymeric layer is incorporated between the skin and boundary layers for a structure comprising:
   skin/secondary/boundary/microlayered core/boundary/ secondary/skin.

5. The extrudate of claim 1 wherein a second microlayered core and a third boundary layer is incorporated between the microlayered core and the boundary layer for a structure comprising:
   skin/boundary/microlayered core/boundary/microlayered core/boundary/skin.

6. The extrudate of claim 5 wherein a secondary polymeric layer is incorporated between the skin and boundary layers for a structure comprising:
   skin/secondary/boundary/microlayers/boundary/microlayers/boundary/secondary/skin.

7. The extrudate of claim 5 wherein and said first microlayered core comprises at least one barrier microlayer that serves as an oxygen barrier or as a moisture barrier or to deliver improved opacity, and said second microlayered core comprises at least one barrier microlayer that serves as an oxygen barrier or as a moisture barrier or to deliver improved opacity.

8. The extrudate of claim 7 wherein said first microlayered core is different than said second microlayered core.

9. The extrudate of claim 1 wherein the microlayered core comprises a plurality of barrier layers adhered to a plurality of tie layers in a repeating sequence of microlayers represented by the structure "E/T", wherein "E" represents a barrier microlayer and "T" represents a tie microlayer.

10. The extrudate of claim 9 wherein the microlayered core comprises between 5 and 125 microlayers.

11. The extrudate of claim 10 wherein the microlayered core comprises at least six tie microlayers and at least five barrier microlayers, said microlayers ordered such that each boundary layer adheres to a tie microlayer.

12. The extrudate of claim 10 wherein the microlayered core comprises at least five tie microlayers and at least six barrier microlayers, said microlayers ordered such that each boundary layer adheres to a barrier microlayer.

13. The extrudate of claim 1 which is further sandwiched between two polymeric films to form an extrusion laminate comprising:
film/skin/boundary/microlayered core/boundary/skin/film
wherein the thickness of the film is from about 9 microns to about 125 microns.

14. The laminate of claim 13 wherein said film is selected from the group consisting of biaxially oriented film, machine direction oriented film, cast film and blown films, wherein said films comprise polypropylene (PP), polyethylene (PE), polyester (PET), nylon, poly lactic acid (PLA), cellophane, paper, or a combination thereof.

15. An extrusion laminate having a structure comprising:
film/skin/boundary/first microlayered core/boundary/second microlayered core/boundary/skin/film
wherein said first microlayered core and said second microlayered core comprises at least one barrier microlayer adhered to at least one tie microlayer, and wherein the thickness of the barrier microlayer is less than about five microns and the thickness of the tie microlayer is less than about five microns, and wherein said barrier microlayer is selected from the group consisting of ethylene vinyl alcohol copolymer (EVOH), polyvinylidene dichloride (PVDC), vinylidene chloride/methyl acrylate copolymer, polyamide, polyester, high density polyethylene (HDPE), low density polyethylene (LDPE), polypropylene (PP), polyethylene terephthalate (PET), and combinations thereof; and wherein said tie microlayer is selected from the group consisting of maleic anhydride, anhydride modified linear low density polyethylene, ethylene methacrylate, polyamide, and combinations thereof.

* * * * *